(12) United States Patent
Tomizaki

(10) Patent No.: US 6,346,329 B1
(45) Date of Patent: Feb. 12, 2002

(54) CURABLE RESIN COMPOSITION

(75) Inventor: Yasuhiro Tomizaki, Chigasaki (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/540,540

(22) Filed: Mar. 31, 2000

(30) Foreign Application Priority Data

Apr. 1, 1999 (JP) .............................................. 11-094616

(51) Int. Cl.[7] .............................................. B32B 27/38
(52) U.S. Cl. ........................ 428/413; 523/451; 523/453; 523/461; 525/523; 525/524; 525/533; 528/89; 528/90; 528/93
(58) Field of Search ................................ 523/451, 453, 523/461; 528/89, 90; 428/93, 413; 525/523, 524, 533

(56) References Cited

FOREIGN PATENT DOCUMENTS

| JP | 7-133340 | | 5/1995 |
| JP | 07133340 | * | 5/1995 |

* cited by examiner

*Primary Examiner*—Robert Dawson
*Assistant Examiner*—D. Aylward
(74) *Attorney, Agent, or Firm*—Wenderoth, Lind & Ponack, L.L.P.

(57) ABSTRACT

The present invention provides a curable resin composition with excellent low temperature curability and good storage stability, which comprises (A) a polyepoxide compound, (B) a curing agent containing at least one functional group selected from carboxyl group and acid anhydride group, and (C) a potential curing catalyst composed of a reaction product of an onium salt and diphenyl phosphate.

12 Claims, No Drawings

CURABLE RESIN COMPOSITION

The present invention relates to a novel curable resin composition which is excellent in low temperature curability, has good storage stability and improved leveling property, and which is useful particularly in the field of paint.

Up to the present, in a resin composition comprising an epoxy resin and curing agent such as polycarboxylic acid anhydride, a curing catalyst such as tertiary amine, quaternary ammonium salt, etc. is usually combined in order to accelerate its curing.

The curable resin composition combined with said curing catalyst, however, has a problem of poor storage stability and short pot life, because said curing catalyst has a strong accelerating effect on the reaction between epoxy resin and curing agent.

In order to improve the storage stability of such a curable resin composition, Japanese Laid-open Patent Publication No. 133340/1995 proposes to use a potential curing catalyst composed of an onium salt and an acidic phosphoric acid ester such as mono- or di-alkyl phosphate, as a curing catalyst. Whereas, there still remains the problem with a curable resin composition which contains such a potential curing catalyst that its low temperature curability is reduced more or less, while its storage stability is improved.

Surprisingly, however, it is now found that a curable resin composition excelling in both storage stability and low temperature curability and furthermore exhibiting improved leveling property can be obtained when a chemical reaction product of diphenyl phosphate, which is not taught in said Japanese Publication, with an onium salt is used as the potential curing catalyst.

Thus, according to the present invention there is provided a curable resin composition which comprises:
(A) a polyepoxide compound,
(B) a curing agent containing at least one functional group selected from carboxyl group and acid anhydride group, and
(C) a potential curing catalyst composed of a reaction product of an onium salt with diphenyl phosphate.

Hereafter the curable resin composition of the present invention is described in more detail.

(A) Polyepoxide Compound

The polyepoxide compound (A) used in the resin composition of the present invention is a resin having on average about 2 or more epoxy groups per molecule. As the polyepoxide compound (A) any compounds known per se in the field of curable resin composition, particularly in the field of paint, can be used. Generally, however, there can be particularly favorably used an acrylic resin containing on average 2–50, preferably 6–35, epoxy groups per molecule and having a weight-average molecular weight in the range of from about 1,500 to about 15,000, preferably about 2,000 to about 10,000, for forming a cured coating film with good performances such as finishing appearance, surface smoothness, outdoor weatherability, etc.

As said acrylic resin containing epoxy groups there is included, for example, an acrylic copolymer containing epoxy groups which is obtained by radical copolymerization of a monomer containing epoxy group, which has one each of epoxy group and ethylenic unsaturated group such as (meth)acryloyl group per molecule, for example glycidyl (meth)acrylate, allyl glycidyl ether, etc. with one or more of other radical-polymerizable unsaturated monomers.

The copolymer thus obtained can contain generally about 5 to about 60% by weight, preferably about 15 to about 55% by weight, inter alia, about 20 to about 50% by weight, of the structural unit derived from the above-mentioned monomer containing epoxy group, based upon the weight of said copolymer.

As such other polymerizable unsaturated monomers copolymerizable with the above-mentioned monomer containing epoxy group, there are included, for example, alkyl (meth)acrylates such as methyl (meth)acrylate, ethyl (meth) acrylate, propyl (meth)acrylate, butyl (meth)acrylate, 2-ethylhexyl (meth)acrylate, octyl (meth)acrylate, lauryl (meth)acrylates, etc.; cycloalkyl (meth)acrylates such as cyclohexyl (meth)acrylate, etc.; hydroxyalkyl (meth) acrylates such as hydroxyethyl (meth)acrylate, hydroxybutyl (meth)acrylates, etc. and such ethylenic unsaturated monomers containing hydroxyl group as adducts of monomers with ε-caprolactone; fluoro-alkyl (meth)acrylates such as perfluorooctyl (meth)acrylate, etc.; vinyl aromatic compounds such as styrene, vinyltoluene, etc.; unsaturated nitrile compounds such as (meth)acrylonitrile, etc.; fluoro-olefins such as tetrafluoroethylene, trifluorochloroethylene, vinylidene fluoride, vinyl fluoride, etc.; vinyl esters, olefin compounds, etc. They can be used each singly or in combination of two or more.

Copolymerization method of the above-mentioned monomer containing epoxy group and other polymerizable unsaturated monomer or monomers is not critical, but can be conducted by any method known per se, for example, solution polymerization, suspension polymerization, emulsion polymerization, etc.

(B) Curing Agent

The curing agent (B) used in the resin composition of the present invention includes polyfunctional substances which contain functional groups selected from carboxyl group and acid anhydride group

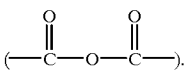

As said curing agent there are included polycarboxylic acid curing agent containing at least two carboxyl groups per molecule; acid anhydride curing agent containing at least one acid anhydride group per molecule; acid anhydride curing agent containing carboxyl group, which contains at least one carboxyl group and at least one acid anhydride group per molecule, etc.

As polycarboxylic acid curing agent there are included, for example, as low molecular weight polycarboxylic acid, for example, tetrahydrophthalic acid, hexahydrophthalic acid, phthalic acid, trimellitic acid, 1,5-naphthalenedicarboxylic acid, 2,3,6,7-naphthalenetetracarboxylic acid, etc.; as high molecular weight polycarboxylic acid, for example, polycarboxylic acid resin of vinyl-type, polyester type, etc. (usually having weight average molecular weight in the range of about 500 to about 80,000, particularly 2,000 to 20,000 and acid value in the range of 20 to 350 mgKOH/g, particularly 80 to 200 mgKOH/g).

As the above-mentioned vinyl type polycarboxylic acid resin there can be mentioned, for example, (co)polymers obtained by radical polymerization of carboxyl group-containing ethylenic unsaturated monomers, for example, (meth)acrylic acid, crotonic acid, half-esterified product of 3,6-endomethylene tetrahydrophthalic anhydride and such ethylenic unsaturated monomers containing hydroxyl group as those mentioned above or the like, if necessary with such other ethylenic unsaturated monomers as mentioned above;

half esterified products of (co)polymers which are obtained by radical polymerization of ethylenic unsaturated monomers containing acid anhydride groups, for example, itaconic anhydride, maleic anhydride, etc. if necessary with such other ethylenic unsaturated monomers as those mentioned above, and further half-esterifying the same using an esterifying agent, for example, methanol ethanol propanol, butanol, pentanol hexanol, octanol acetol allyl alcohol, propargyl alcohol etc.; (co)polymers obtained by radical polymerization of monomers which are obtained by half esterification of such ethylenic unsaturated monomers containing acid anhydride groups as mentioned above with such an esterifying agent as mentioned above, if necessary together with such other ethylenic unsaturated monomers as those mentioned above; half esterified products of (co) polymers containing hydroxyl groups which are obtained by radical polymerization of such ethylenic unsaturated monomers containing hydroxyl groups as those mentioned above if necessary with such other ethylenic unsaturated monomers as those mentioned above, and half-esterifying the same using carboxylic anhydride, for example, acetic anhydride, succinic anhydride, etc.

The above-mentioned polyester type polycarboxylic acid resin is an esterified product of a polybasic acid component and polyhydric alcohol component under the condition of excess amount of polybasic acid component. As the polybasic acid component there can be mentioned, for example, dibasic or higher polybasic acids, such as phthalic acid (anhydride), isophthalic acid, terephthalic acid, succinic acid (anhydride), adipic acid, fumaric acid, maleic acid (anhydride), tetrahydrophthalic acid (anhydride), hexahydrophthalic acid (anhydride), trimellitic acid (anhydride), methylcyclohexenetricarboxylic acid, pyromellitic acid (anhydride), etc., and as polyhydric alcohol component there can be mentioned, for example, ethylene glycol, propylene glycol diethylene glycol butanediol neopentyl glycol, cyclohexanedimethanol, 1,6-hexanediol, glycerol trimethylolethane, trimethylolpropane, pentaerythritol bis (hydroxyethyl)terephthalate, (hydrogenated) bisphenol, polyisocyanate polyol, triethanolamine, etc. Hydroxyl group-containing polyester resins and half-esterified products of acid anhydrides are also used as polyhydric alcohol component.

As curing agent containing acid anhydride groups there can be mentioned, for example, vicinal dicarboxylic acid anhydrides such as maleic anhydride, succinic anhydride, dodecylsuccinic anhydride, tetrahydrophthalic anhydride, 3-methyltetrahydrophthalic anhydride, hexahydrophthalic anhydride, 3-methylhexahydrophthalic anhydride, 3,6-endomethylene tetrahydrophthalic anhydride, 3,6-endodichloromethylene tetrachlorophthalic anhydride, phthalic anhydride, etc.; (co)polymers obtained by radical polymerization of such ethylenic unsaturated monomers containing acid anhydride groups as those mentioned above, if necessary with such other ethylenic unsaturated monomers as those mentioned above, said (co)polymers usually having weight average molecular weight in the range of about 500 to about 80,000, particularly about 2,000 to about 20,000 and acid value in the range of 20 to 350 mgKOH/g, particularly 80 to 200 mgKOH/g.

As acid anhydride curing agent containing carboxyl groups there can be mentioned, for example, low molecular weight compound containing both carboxyl group and acid anhydride group such as trimellitic anhydride, etc.; copolymer obtained by radical polymerization of such ethylenic unsaturated monomer containing carboxyl group as those mentioned above and such ethylenic unsaturated monomer containing acid anhydride group as those mentioned above, if necessary with such other ethylenic unsaturated monomer as mentioned above, said copolymer usually having weight average molecular weight in the range of about 500 to about 80,000, particularly about 2,000 to about 20,000 and acid value in the range of 20 to 350 mgKOH/g, particularly 80 to 200 mgKOH/g.

Among the above-mentioned curing agents a polycarboxylic acid curing agent containing at least two carboxyl groups per molecule is particularly preferable in the present invention.

(C) Potential Curing Catalyst

The potential curing catalyst (C) used in the composition of the present invention is a reaction product of an onium salt with diphenyl phosphate. Preferred reaction product is one obtained by reacting them at a ratio of 0.5–1.5 moles, preferably 0.8–1.2 moles of diphenyl phosphate per mol of an onium salt. The reaction is a kind of salt-exchange reaction, which readily progress by contacting the two in a suitable inert organic solvent at temperatures ranging from about 0 to about 80° C., normally at room temperature.

The onium salt is a compound containing an element with lone pair such as nitrogen, phosphorus, sulfur, etc., in which proton or another compound in the form of cation coordinates to the lone pair.

As the above-mentioned onium salt there can be mentioned specifically, for example, ① quaternary ammonium salt represented by the following general formula (I)

$$(R_1R_2R_3R_4N)OH \qquad (I)$$

② quaternary phosphonium salt represented by the following general formula (II)

$$(R_1R_2R_3R_4P)OH \qquad (II)$$

③ tertiary sulfonium salt represented by the following general formula (III)

$$(R_1R_2R_3S)OH \qquad (III).$$

In the above-mentioned general formulae (I) to (III), $R_1$, $R_2$, $R_3$ and $R_4$ each independently represents hydrogen atom, unsubstituted or substituted aliphatic, alicyclic, aromatic or aromatic-aliphatic hydrocarbon group. As said hydrocarbon group there can be mentioned, for example, straight chain or branched chain $C_1$–$C_6$ alkyl groups such as methyl, ethyl, n- or iso-propyl n-, iso-, sec- or tert-butyl n-pentyl etc.; $C_4$–$C_{10}$ cycloalkyl groups such as cyclopropyl, cyclopentyl cyclohexyl, cyclooctyl, etc.; aryl groups such as phenyl, tolyl, etc.; and aralkyl groups such as benzyl, phenethyl etc. These hydrocarbon groups may be further substituted with substituents, for example, halogen atoms such as fluorine, chlorine, bromine, etc.; hydroxyl group; alkoxy groups such as methoxy, ethoxy, n- or isopropoxy, etc.

As preferable examples of onium salts, there can be mentioned, for example, ammonium salts such as tetraethylammonium hydroxide, tetrabutylammonium hydroxide, diethydibutylammonium hydroxide, dimethyldioleylammonium hydroxide, di-methylbenzyllaurylammonium hydroxide, dimethyldicyclohexylammonium hydroxide, etc.; phosphonium salts such as tetraethylphosphonium hydroxide, tetrabutylphosphonium hydroxide, di-methylbenzyllaurylphosphonium hydroxide, etc.; sulfonium salts such as triethylsulfonium hydroxide, etc.

Curable Resin Composition

The curable resin composition provided by the present invention comprises the above-mentioned three components, namely, polyepoxide compound (A), curing agent(B) and potential curing catalyst (C).

The mixing ratio of these components in the composition of the present invention can be varied according to intended usage, etc. of said composition but generally, per 100 parts by weight of the polyepoxide compound (A),

- 10 to 200 parts by weight, preferably 30 to 150 parts by weight, more preferably 50 to 100 parts by weight of the curing agent (B), and
- 0.5 to 10 parts by weight, preferably 1 to 6 parts by weight, more preferably 2 to 4 parts by weight, of the potential curing catalyst (C) can be used.

The curable resin composition of the present invention can be used, for example, in the form of powder or in the form of solution or dispersion in organic solvent.

In the curable resin composition of the present invention there can be optionally mixed, besides the above-mentioned components (A)—(C), color pigment, filler, organic polymer, inorganic or organic fine particles, organic solvent, flow adjusting agent, ultraviolet absorbent, light stabilizer, etc.

The curable resin composition of the present invention is useful as resin composition for coating, particularly for topcoat paint for motorcar body, because it is excellent in storage stability in one-package form and low temperature curability and capable of providing a coating film excellent in performances such as finishing appearance, surface smoothness, acid resistance, etc. As topcoat paint for motorcar, the curable resin composition of the present invention can be favorably used, for example, as clear paint for solid color or metallic color finishing in case of forming multilayer topcoating film by processes such as 2-coat-1-bake, 2-coat-2-bake, 3-coat- 1-bake, 3-coat-2-bake, etc.

The coating film formed with the curable resin composition of the present invention can be cured by baking usually at temperatures of about 100 to about 180° C., preferably about 120 to about 140° C., for about 20 to about 40 minutes.

The present invention is illustrated more specifically by the following Examples:

EXAMPLE 1

A curable resin composition was prepared by uniformly mixing 100 parts by weight of polyepoxide solution (copolymer of methyl methacrylate/n-butyl methacrylate/n-butyl acrylate/styrene/glycidyl methacrylate=2/46/10/2/40% by weight; 30 weight-average molecular weight: about 10,000; 50% by weight toluene solution), 100 parts by weight of polycarboxylic acid solution (copolymer of methyl methacrylate/n-butyl methacrylate/n-butyl acrylate/styrene/acrylic acid=2/50/30/3/15% by weight; weight-average molecular weight: about 10,000; 50% by weight xylene solution) and 2 parts by weight of tetrabutylammonium diphenyl phosphate (a reaction product of tetrabutylammonium hydroxide and diphenyl phosphate=1:1 molar ratio).

EXAMPLE 2

A curable resin composition was prepared by uniformly mixing 100 parts by weight of polyepoxide solution (the same as in Example 1), 100 parts by weight of polycarboxylic acid solution (the same as in Example 1) and 2 parts by weight of tetrabutylammonium diphenyl phosphate (a reaction product of tetrabutylammonium hydroxide and diphenyl phosphate=1:1.2 molar ratio).

Comparative Example 1

A curable resin composition was prepared by uniformly mixing 100 parts by weight of polyepoxide solution (the same as in Example 1), 100 parts by weight of polycarboxylic acid solution (the same as in Example 1), 1 part by weight of tetrabutylammonium bromide and 2 parts by weight of bis(ethylhexyl) phosphate.

Comparative Example 2

A curable resin composition was prepared by uniformly mixing 100 parts by weight of polyepoxide solution (the same as in Example 1) and 100 parts by weight of polycarboxylic acid solution (the same as in Example 1).

Comparative Example 3

A curable resin composition was prepared by uniformly mixing 100 parts by weight of polyepoxide solution (the same as in Example 1), 100 parts by weight of polycarboxylic acid solution (the same as in Example 1) and 1 part by weight of tetrabutylammonium bromide.

Comparative Example 4

A curable resin composition was prepared by uniformly mixing 100 parts by weight of polyepoxide solution (the same as in Example 1), 100 parts by weight of polycarboxylic acid solution (the same as in Example 1) and 2 parts by weight of bis(ethylhexyl) phosphate.

Comparative Example 5

A curable resin composition was prepared by uniformly mixing 100 parts by weight of polyepoxide solution (the same as in Example 1), 100 parts by weight of polycarboxylic acid solution (the same as in Example 1) and 2 parts by weight of tetrabutylammonium phenylphosphate (a reaction product of tetrabutylammonium hydroxide and monophenylphosphate =1:1.2 molar ratio).

Examples and Comparative Examples

Storage stability and performances of coating film in relation to the curable resin compositions obtained in the above-mentioned Examples 1–2 and Comparative Examples 1–5 were tested by the following methods. The results are shown in Table 1 appearing later.

Storage stability: The resin composition of each Example and Comparative Example was diluted to the viscosity of 30 seconds/Ford cup No. 4 (20° C. ) and used as test sample. After storing the samples under airtightly closed condition at 60° C. for 32 hours, the viscosity of each sample was measured and evaluated by the following rating.

◎: Viscosity incerase by 0–5 seconds,

○: Viscosity incerase by 5–10 seconds,

Δ: Viscosity incerase by more than 11 seconds,

×: Gelled.

Preparation of test plate: Epoxy resin type cationic electrodeposition paint was coated (dried film thickness: 25 µm) on the chemically treated, dull finished steel plate and cured at 170° C. for 30 minutes. After that "LUGA BAKE AM" (trade name, made by Kansai Paint Co., Ltd., polyester resin/melamine resin type paint for motorcar) was coated as an intermediate coating to a dried film thickness of 30 µm and cured at 140° C. for 30 minutes. Then the coating surface was water polished with #400 sandpaper, dried and wiped with petroleum benzine to make a base material.

Then "MAGICRON #1000 Base Coat (Silver)" (trade name, made by Kansai Paint Co., Ltd., polyester resin / melamine resin type) was spray-coated on the above-mentioned base material to a dried film thickness of about 15

μm, splashed off, and then test sample of the resin composition of each Example and Comparative Example was spray-coated to a dried film thickness of about 40 μm and baked at 120° C. or 140° C. for 30 minutes.

Performance tests of the formed coating film were conducted by the following methods.

Appearance: Surface of the cured product was visually evaluated.

◯: No abnormality was observed on the surface.

Δ: Wrinkle, etc. were observed and matting appeared.

x: Wrinkle, etc. markedly appeared and gloss was low.

Curability: Surface of the cured product was wiped 10 times back and forth with a gauze soaked with xylene while strongly pressing it against the surface with fingertip and then the appearance of the surface was visually evaluated.

◯: No abnormality was observed on the surface. Curability was good.

Δ: A little scratch was observed on the surface. Curability was inferior.

x: Surface was dissolved with xylene. Curability was markedly inferior.

Yellowing resistance: Each of the compositions obtained in Examples and Comparative Examples was applied and cured by heating at 140° C. for 30 minutes. Thus cured film was further heated at 160° C. for 30 minutes and yellowing in each film was observed.

◯: No yellowing

Δ: Minor yellowing x: Notable yellowing.

TABLE 1

|  | Example | | Comparative Example | | | | |
| --- | --- | --- | --- | --- | --- | --- | --- |
|  | 1 | 2 | 1 | 2 | 3 | 4 | 5 |
| Storage stability Performance | ⊚ | ⊚ | ◯ | ⊚ | x | ⊚ | ◯ |
| Appearance | ◯ | ◯ | ◯ | ◯ | Δ | ◯ | ◯ |
| Low temperature curability (at 120° C.) | ◯ | ◯ | Δ | x | ◯ | x | Δ |
| Curability (at 140° C.) | ◯ | ◯ | ◯ | Δ | ◯ | x | ◯ |
| Yellowing resistance | ◯ | ◯ | Δ | ◯ | Δ | ◯ | Δ |

What is claimed is:

1. A curable resin composition which comprises:
   (A) a polyepoxide compound,
   (B) a curing agent containing at least one functional group selected from carboxyl group and acid anhydride group, and
   (C) a potential curing catalyst composed of a reaction product of onium salt and diphenyl phosphate.

2. A curable resin composition as defined in claim 1 wherein the onium salt in the potential curing catalyst (C) is selected from the group consisting of the compounds represented by the following general formulae (I) to (III)

$$(R_1R_2R_3R_4N)OH \quad (I)$$

$$(R_1R_2R_3R_4P)OH \quad (II)$$

$$(R_1R_2R_3S)OH \quad (III)$$

wherein $R_1$, $R_2$, $R_3$ and $R_4$ each independently represents hydrogen atom, unsubstituted or substituted aliphatic, alicyclic, aromatic or aromatic-aliphatic hydrocarbon group.

3. A curable resin composition as defined in claim 2 wherein the onium salt in the potential curing catalyst (C) is selected from the group consisting of tetraethylammonium hydroxide, tetrabutylammonium hydroxide, diethydibutylammonium hydroxide, dimethyldioleylammonium hydroxide, dimethylbenzyllaurylammonium hydroxide, dimethyldicyclohexylammonium hydroxide, tetraethylphosphonium hydroxide, tetrabutylphosphonium hydroxide, demethylbenzyllaurylphosphonium hydroxide and triethylsulfonium hydroxide.

4. A curable resin composition as defined in claim 1 wherein the potential curing catalyst (C) is a product obtained by reacting 0.5 to 1.5 mols of diphenyl phosphate per mol of the onium salt.

5. A curable resin composition as defined in claim 1 wherein the potential curing catalyst (C) is a product obtained by reacting 0.8 to 1.2 mols of diphenyl phosphate per mol of the onium salt.

6. A curable resin composition as defined in claim 1 wherein the polyepoxide compound (A) is an epoxy group containing-acrylic resin which has on average 2 to 50 epoxy groups per molecule and a weight-average molecular weight in the range of about 1,500 to about 15,000.

7. A curable resin composition as defined in claim 1 wherein the curing agent (B) is selected from the group consisting of polycarboxylic acid curing agent containing at least two carboxyl groups per molecule, acid anhydride curing agent containing at least one acid anhydride group per molecule and carboxyl group-containing acid anhydride curing agent which contains at least one carboxyl group and at least one acid anhydride group per molecule.

8. A curable resin composition as defined in claim 1 wherein the curing agent (B) is a polycarboxylic acid curing agent containing at least two carboxyl groups per molecule.

9. A curable resin composition as defined in claim 1 which comprises 10 to 200 parts by weight of the curing agent (B) and 0.5 to 10 parts by weight of the potential curing catalyst (C), per 100 parts by weight of the polyepoxide compound (A).

10. A curable resin composition according to claim 1 which comprises 30 to 100 parts by weight of the curing agent (B) and 1 to 6 parts by weight of the potential curing catalyst (C), per 100 parts by weight of the polyepoxide compound (A).

11. A topcoat paint for motorcar comprising the curable resin composition as defined in claim 1.

12. An article coated by using the curable resin composition as defined in claim 1.

* * * * *